United States Patent [19]

Guipaud

[11] 4,249,494
[45] Feb. 10, 1981

[54] INTERNAL COMBUSTION ENGINE IGNITION SYSTEMS

[75] Inventor: Serge C. Guipaud, Saint-Papoul, France

[73] Assignee: Societe pour l'Equipement de Vehicules, Issy les Moulineaux, France

[21] Appl. No.: 94,674

[22] Filed: Nov. 15, 1979

[30] Foreign Application Priority Data

Nov. 24, 1978 [FR] France ............................ 78 33294

[51] Int. Cl.³ ................................................ F02P 5/04
[52] U.S. Cl. .................................... 123/425; 123/435; 123/475; 73/35
[58] Field of Search ........... 123/148 E, 117 R, 117 D, 123/32 CA, 32 SA, 32 EF, 119 ED; 73/35

[56] References Cited

U.S. PATENT DOCUMENTS

| 3,500,802 | 3/1970 | Long | 123/32 CA |
|---|---|---|---|
| 3,874,355 | 4/1975 | Suda | 123/148 E |
| 3,892,207 | 7/1975 | Weise | 123/32 SA |
| 4,153,020 | 5/1979 | King | 73/35 |
| 4,164,204 | 8/1979 | Guipaud | 123/148 E |
| 4,170,209 | 10/1979 | Petrie | 123/148 E |
| 4,180,023 | 12/1979 | Kobayashi | 123/32 CA |

Primary Examiner—Ronald B. Cox
Attorney, Agent, or Firm—Brisebois & Kruger

[57] ABSTRACT

In an internal combustion engine ignition system having a knock sensor to back-off the ignition advance at the onset of pre-ignition knocking in the engine, the sensor is activated only during a fraction of the power stroke of each piston and the activation is achieved by processing of the ignition triggering signal rather than by incorporation of position sensors on the drive shaft of the engine/gearbox combination. The signal-processing device includes first stage means to generate a signal which is shifted by a constant time relative to the signal which it receives, and second stage means which generates a signal which is shifted relative to the incoming signal by a time corresponding to a constant angle of rotation of the engine (to take into account engine rotation speed) and these stages define the beginning and the end of the periodic signal required for control of the vibration sensor.

8 Claims, 4 Drawing Figures

INTERNAL COMBUSTION ENGINE IGNITION SYSTEMS

BACKGROUND OF THE INVENTION

The present invention relates to an electronic device intended to be used in combination with the devices which make it possible to trigger the ignition in the cylinders of an internal combustion engine.

It is known that for satisfactory running of an internal combustion engine it is necessary to use a distributor, the rotation shaft of which is driven by the engine, this distributor producing an ignition signal which triggers the discharge of an ignition coil onto the particular spark plug which should be fed with a high-voltage current. The ignition signal is timed to have a shift relative to the top dead centre, TDC, position of the piston which is on its compression stroke and above which ignition must be caused. The shift of the ignition signal is a function of the rotation speed in accordance with a defined curve, and for the production of the ignition signal the distributor must include a sensor having a moving part driven by the rotation shaft of the distributor and subjected to angular shift making it possible to achieve the desired timing ignition delay.

Furthermore, it is known that under certain operating conditions an internal combustion engine experiences a knocking phenomenon which imposes highly undesirable vibrations on the pistons. If attempts are made to improve the efficiency of the engine by causing it to run systematically at the maximum of the torque curve, there is a risk that under certain running conditions the knocking phenomenon will occur. It has therefore been envisaged to identify the occurrence of the knocking phenomenon, in order to reduce, at this moment alone, the value of the ignition timing advance, thus causing the engine to run at maximum torque only for as long as the knocking phenomenon is not occurring. This requires a vibration sensor located on the engine/gearbox unit to identify the occurrence of knocking, (which occurs at frequencies of about 5 KHz). This sensor is associated with a bandpass filter in order to eliminate background noise but, to avoid any inopportune action of the sensor, it has been attempted to reduce the operating time to that fraction of the cycle in which knocking can occur. In fact, it has been found that during the running cycle of a cylinder, the knocking phenomenon only occurs during the beginning of the power stroke and, more precisely, within a range up to about 30° of crank shaft rotation after the top dead centre, whereas the complete power stroke of a piston continues until 180° after the top dead centre. It is seen, therefore, that it is desirable to be able to trigger the functioning of the knock sensor by means of a signal which appears at, or slightly after, the top dead centre position and which disappears about 30° after the top dead centre. Clearly, this signal would be produced by means of a proximity sensor which is driven by the engine and produces a signal throughout the travel of the sensor through an angular range; it would also be possible to use a position sensor identifying the top dead centre position, and to define therefrom the beginning and the end of the desired sensor triggering signal by means of an electronic circuit. However, this procedure requires the use of a specific sensor for triggering the operation of the vibration sensor intended to prevent knocking. With a view to reducing cost, it is obviously desirable to reduce to a minimum the number of sensors to be employed, and the object of the invention is consequently to trigger the functioning of the antiknock vibration sensor at the opportune moment, without resorting to a proximity or position sensor identifying the top dead centre position, simply by using the ignition signal produced by the distributor.

The difficulty arises from the fact that this ignition signal is timed to occur at an instant which is shifted relative to the top dead centre position of the piston, the delay being a function of the rotation speed of the engine.

BRIEF SUMMARY OF THE INVENTION

It has now been noted that, on a graph showing the ignition timing angles as ordinate and the rotation speeds as abscissa, the usual ignition curves of internal combustion engines fall within a relatively narrow band located symmetrically relative to a line passing through the origin. It is thus possible to define a mean line passing through the origin and for a given rotation speed the difference between (a) the real ignition shift and (b) the ignition shift whose value corresponds to the above-mentioned line, remains less than a relatively small maximum error. In most cases, the margin of error remains less than 10° and corresponds to half the width of the band containing the ignition curve, the said width being measured parallel to the ordinate axis of the said curve.

According to the invention if, for a given value of the rotation speed of the engine, the value of the angle corresponding to the mean line defined above is subtracted from the actual ignition timing angle, the resulting means value of the angular shift is 0, that is to say the top dead centre position is obtained within the limits of error corresponding to half the width of the band which contains the ignition curve. It is therefore seen that, by using the ignition signal, it is possible to define a signal which will, within a margin of error, correspond to attainment of the top dead centre position. In order to obtain this signal it is necessary to subtract, from the value of the ignition shift, a value which is proportional to the rotation speed. Thus, at the moment when the ignition signal appears, it is necessary to subtract a certain time corresponding to the value given by the above-mentioned mean line, in order to obtain a signal which corresponds, within a margin of error, to arrival of the piston at its top dead centre position. The time which should be added is that which corresponds to an angular shift which is proportional to the rotation speed, that is to say that it is a constant time. In other words, if a constant time is subtracted from the ignition signal, the timing of the top dead centre position is obtained within a margin of error. This means has therefore made it possible to dispense with the use of an additional sensor.

If it is then desired to define, from the top dead centre position, an angular range in which the knock sensor can function it is sufficient to subtract, from the signal approximately corresponding to passage of the piston through the top dead centre position, a time which corresponds to a rotation through a constant angle, namely a time which corresponds to a fixed fraction of the running cycle. In this way it is possible to produce economically a circuit permitting the temporary operation, in the desired part of the operating cycle, of the vibration sensor which identifies knock.

Consequently, the present invention provides the new industrial product which consists of an electronic device, associated with a periodic generator of ignition signals for an internal combustion engine where the ignition signal is timed in each cycle relative to the top dead centre position of the piston which is on its compression stroke, by a value which varies as a function of the rotation speed of the engine, this device producing a periodic signal the beginning and the end of which are positioned in an essentially constant manner in each cycle, relative to the instant of passage of the piston through the top dead centre position, with a predefined margin of error. This electronic device is characterised in that it comprises on the one hand at least one stage which generates a signal which is shifted by a constant interval, relative to the signal which it receives, and on the other hand at least one stage which generates a signal which is shifted, relative to the signal which it receives, by an interval corresponding to a constant angle of rotation of the engine, these two types of stage being arranged in series in order to define the beginning and/or the end of the resulting signal.

In a preferred embodiment, the device comprises a single stage ensuring a shift of a constant interval, the said stage receiving the ignition signal and controlling at least one stage which ensures a shift corresponding to a constant angle of rotation; the said stage which ensures a shift of a constant interval is a monostable multivibrator consisting of a capacitance which can discharge through a transistor on receiving the ignition signal, the charging voltage of this capacitance being compared with a constant voltage by a comparator, in order to produce a signal at the moment when the two compared voltages are equal; the stage which ensures a shift corresponding to a constant angle of rotation of the engine is a sawtooth voltage generator associated with a peak detector, the peak voltage obtained by the sawtooth voltage generator being chopped and compared with the sawtooth voltage; the sawtooth voltage generator comprises a condenser which can discharge through a transistor on receiving the signal received by the stage which generates a shift corresponding to a constant angle of rotation of the engine; the angular shift corresponding to the beginning of the signal produced by the device according to the invention is zero and the device comprises a single stage generating a signal which is shifted by a time corresponding to a constant angle of rotation of the engine, this stage being arranged in series, downstream of the other type of stage in the device; the signal received by the device controls the operation of a vibration sensor throughout the duration of the said signal; the vibration sensor is intended to identify a possible knock in the running of the engine associated with the device.

BRIEF DESCRIPTION OF THE DRAWINGS

In order to provide a clearer understanding of the present invention, one embodiment thereof is shown in the attached drawing and will now be described by way of a purely illustrative and non-limiting example.

In this drawing.

DETAILED DESCRIPTION

Figure 1:
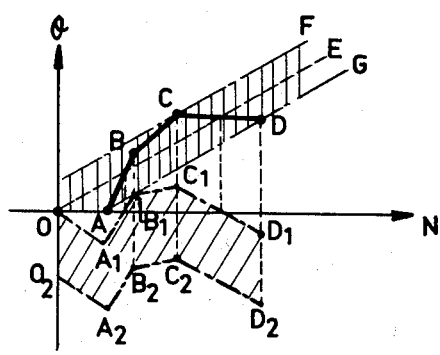
FIG. 1 is a graph plotting an ignition curve giving, as the ordinate, the ignition shift $\theta$ as a function of the rotation speed N of the engine, which speed is plotted as abscissa.

With reference to FIG. 1, it is seen that the engine, with which the device according to the invention is associated, has an advanced ignition curve consisting of four linear segments OA, AB, BC and CD. The graph is constructed by plotting the ignition shifts $\theta$ (expressed in degrees as rotation of the crank shaft) on the ordinate and the rotation speeds N of the engine on the abscissa. The ignition advance is zero as long as the rotation speed has not reached the speed corresponding to point A. It is found that the ignition curve OABCD falls entirely within a band defined by two parallel lines F and G, which are essentially symmetrical relative to a mean line OE. If the ordinates corresponding to the line OE are subtracted from the ordinates of the curve OABCD, a curve $OA_1B_1C_1D_1$ is obtained, the mean line of which consists of the abscissa axis. Now, the line OE corresponds to ignition shifts which are proportional to the rotation speed, that is to say ignition shifts which are obtained during a constant rotation time T. Consequently, if the constant time T is subtracted from the ignition signal corresponding to the curve OABCD, a signal is obtained which is produced with an angular shift relative to the top dead centre position given by a point on the curve $OA_1B_1C_1D_1$. Now, the mean value of this latter curve is a zero angular shift, that is to say that the mean value of the curve corresponds to the timing of the top dead centre position. In other words, if the time T is subtracted from the instant of the ignition signal, the top dead centre position is obtained with a margin of error corresponding to half the width of the band (not shown) parallel to the abscissa axis which contains the curve $OA_1B_1C_1D_1$. Now, the width of this band is equal to the distance between the lines F and G, measured parallel to the ordinate axis in FIG. 1. In the case described, this bandwidth is about 10° (rotation of the crank shaft), that is to say that the margin of error for the identification of the top dead centre position by any point on the curve $OA_1B_1C_1D_1$ is about 5°.

Furthermore, if a signal is defined by adding, to the time which corresponds to the curve $OA_1B_1C_1D_1$, a time equal to that which corresponds to a rotation of the engine through a given angle, for example 30°, a signal is obtained which is shown in FIG. 1 by the curve $O_2A_2B_2C_2D_2$, and this signal is produced, with the same margin of error as that mentioned above, at an instant which corresponds to 30° crank shaft rotation after the top dead centre position.

It is therefore seen that, using the ignition curve OABCD, it is possible to define, with a margin of error of about 5°, a signal which is produced at the top dead centre position, simply by subtracting the constant interval T, and it is then possible to define a signal which is produced 30° after the top dead centre position simply by subtracting, from the first signal, an interval corresponding to a given fraction of the interval which separates two successive ignition pulses, namely, in the particular case described, (a four cylinder four stroke engine) a sixth of the time separating two successive ignition pulses.

Figure 2:
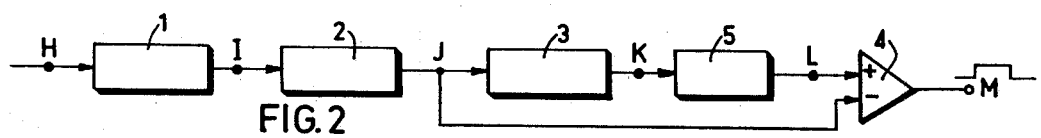
FIG. 2 shows the block diagram of a device according to the invention.
Figure 3:
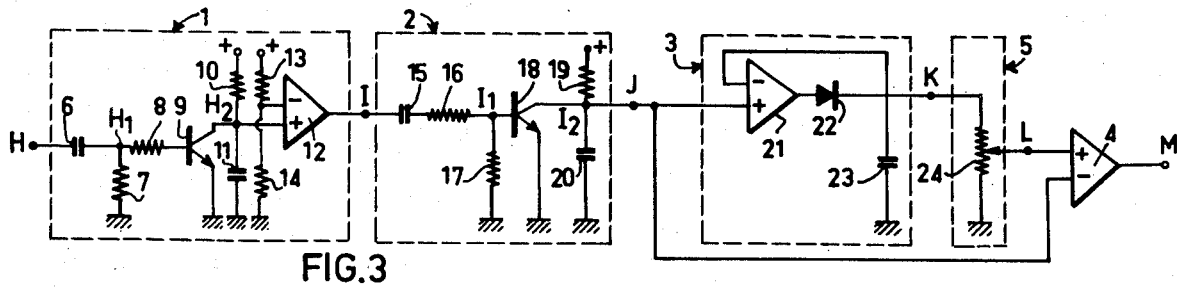
FIG. 3 shows the constructional detail of the device represented schematically in FIG. 2.

FIGS. 2 and 3 show a device which, using the ignition pulses, can derive a signal which begins at an instant corresponding to a point on the curve $OA_1B_1C_1D_1$ and ends at an instant which corresponds to a point on the curve $O_2A_2B_2C_2D_2$. Thus, within a margin of error, it is possible to obtain a signal, the beginning of which is at the top dead centre position and the end of which is 30° after the top dead centre position. With reference to FIG. 2, it will be seen that the ignition signal is produced at H and is sent to a monostable multivibrator 1 which subtracts an interval T and produces, at its output I, a signal which is shifted by the constant time T, that is to say a signal corresponding to a point on the curve $OA_1B_1C_1D_1$ of FIG. 1. This signal is sent to a sawtooth generator 2 which feeds on the one hand a peak detector 3 and, on the other hand the negative input of a comparator 4. The peak detector 3 itself feeds a dividing bridge 5, whose output is connected to the positive input of the comparator 4. The output of the comparator 4 produces, at M, a signal whose leading edge corresponds to a point on the curve $OA_1B_1C_1D_1$ and whose trailing edge corresponds to a point on the curve $O_2A_2B_2C_2D_2$ of FIG. 1.

The construction corresponding to the block diagram of FIG. 2 is shown in FIG. 3. The monostable multivibrator 1 consists of a shunt formed of a condenser 6 and a resistor 7. The condenser 6 is in series with a resistor 8 to the base of a transistor 9, the resistor 7 being connected between on the one hand the condenser 6 and the resistor 8 (point $H_1$), and on the other hand earth, which is connected to the negative feed. The emitter of the transistor 9 is connected to earth. The collector of the transistor 9 is connected to the point $H_2$ at which a resistor 10 is joined to a condenser 11, this junction also being connected to the positive input of a comparator 12. The resistor 10 is connected to the positive feed. The negative input of the comparator 12 is connected to a dividing bridge which consists of two resistors 13 and 14, the resistor 13 being connected to the positive supply and the resistor 14 being connected to earth.

Figure 4:
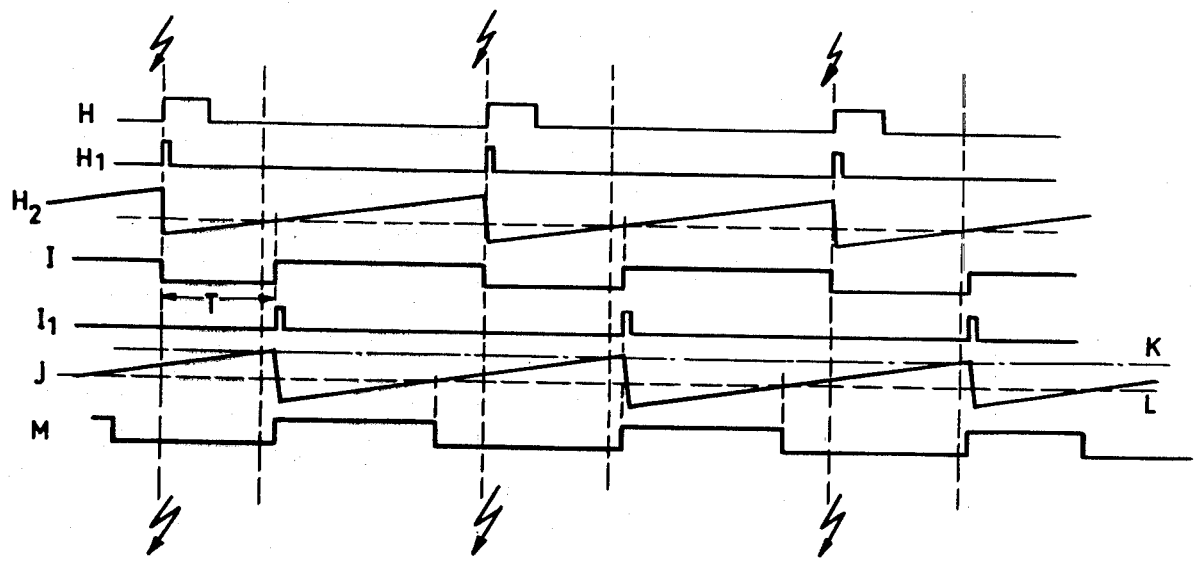
FIG. 4 shows the signals obtained at the various points on the diagram of FIG. 3.

The voltage at the point H is shown on the first line of FIG. 4.

This voltage corresponds to the ignition signal, and the leading edge of the signal triggers ignition. The shunt 6, 7 produces, at the point $H_1$, a voltage shown on the second line of FIG. 4.

Between two successive ignition triggering pulses, the condenser 11 charges up and this causes an essentially linear increase in the voltage at the point $H_2$. At the instant of the pulse created at $H_1$ by the ignition signal, the transistor 9, which was blocked, becomes conductive and enables the condenser 11 to discharge, and a sawtooth voltage shown on the third line of FIG. 4 is thus created at $H_2$. This sawtooth voltage is compared by the comparator 12 with the constant voltage determined by the dividing bridge 13, 14, this constant voltage being shown by a broken line on the third line of FIG. 4.

The comparator 12 emits, at its output, a signal which is at the level 1 when the voltage at its positive input is greater than the voltage at its negative input, and is at the level 0 in the opposite case. The output of the comparator 12 is therefore a signal which drops to the level 0 at the moment of discharge of the condenser 11 and which returns to the level 1 at the moment when the voltages produced at the negative and positive inputs are equal. This signal, produced at the point I on the diagram, is shown on the fourth line of FIG. 4.

It is found that the level 0 is maintained for a constant time T, because this time corresponds to the charging-up time required by the condenser 11 to reach the level fixed by the dividing bridge 13, 14.

The signal produced at the point I is sent to the sawtooth generator 2, the input of which comprises a shunt consisting of a condenser 15 in series with a resistor 16; a resistor 17 connects this group to earth. The group 15, 16, 17 is connected to the base of a transistor 18 and the voltage applied to the base of this transistor 18, that is to say at the point $I_1$ on the diagram, is shown on the fifth line of FIG. 4.

The base of the transistor 18 therefore receives a pulse on the arrival of each leading edge of the signal produced by the monostable multivibrator 1. The emitter of the transistor 18 is connected to earth, and the collector is connected to the point $I_2$. The point $I_2$ is connected to the positive feed via a resistor 19 and is connected to earth via a condenser 20. The point $I_2$ is connected to the output J of the sawtooth generator 2. The condenser 20 charges up gradually so that the voltage at J increases essentially linearly with time until a pulse applied to the base of the transistor 18 renders this transistor conductive and enables the condenser 20 to discharge suddenly. It will therefore be seen that at J a sawtooth voltage shown on the sixth line of FIG. 4 is obtained.

The voltage at J is sent to a peak detector 3. The detector 3 comprises an operational amplifier 21, the positive input of which is connected to the point J on the diagram. The output of the amplifier 21 comprises a diode 22 and a feedback loop which returns to the negative input of the amplifier 21 in order to compensate the drop in voltage at the terminals of the diode 22. The output of the diode 22 is connected to earth via a condenser 23 and constitutes the output K of the peak detector 3. The peak detector 3 measures the peak value of the voltage produced at J, which peak value is indicated by the dot-and-dash line shown on the sixth line of FIG. 4.

The voltage at K is sent to a potentiometer consisting of a resistor 24 and a slide contact, the resistor 24 being connected to earth. The potentiometer 24 therefore constitutes a dividing bridge which makes it possible to tap off part of the voltage at K, so that the voltage at L, at the output of the dividing bridge 5, is as shown by the broken line on the sixth line of FIG. 4.

The voltage obtained at the point L is applied to the positive input of a comparator 4, the negative input of which receives the voltage obtained at the point J on the diagram. The output of the comparator 4 is a signal which is shown on the seventh line of FIG. 4.

This output signal is produced at the level 1 when the condenser 23 discharges, because the voltage at the negative input becomes less than the voltage at the positive input; the signal remains at this level until the sawtooth voltage at the point J becomes equal to the voltage produced at L, after which it drops to the level 0. It is therefore seen that this signal begins at the moment when the signal at point I is produced, that is to say when the interval T has been subtracted from the ignition pulse. This signals ends when a defined fraction of the period separating two successive ignition pulses has elapsed, this fraction being the fraction determined by the ratio set up by the dividing bridge 5. Consequently, the duration of the signal produced at M corresponds to a constant angle of rotation of the engine.

For a suitable choice of the interval T, the beginning of the signal obtained at M is therefore produced at a point which corresponds to a point on the curve $OA_1B_1C_1D_1$ of FIG. 1, and the end of the signal obtained at M is produced at a point which corresponds to a point on the curve $O_2A_2B_2C_2D_2$ of FIG. 1. In other words, within a margin of error which, in the particular case described, is about 5° the beginning of the signal obtained at M is produced at an instant corresponding to the top dead centre position and the end of the signal obtaned at M is produced 30° after the top dead centre position.

It is therefore seen that it is possible to use the signal obtained at M to control the operation of a vibration sensor which would act in the range 0° to 30° after the top dead centre portion, in order to identify the possible production of a knock during operation of the engine with which the device described is associated. This result has been achieved without it being necessary to employ a special rotation sensor, and this permits a considerable saving in terms of cost.

Of course, the embodiment described in no way implies a limitation and can form the subject of any desirable modifications without thereby going outside the spirit and scope of the invention as defined by the appended claims.

I claim:

1. An electronic device to be associated with a periodic generator of ignition signals for an internal combustion engine, the ignition signal being shifted in each cycle relative to the top dead centre position of the piston on its compression stroke, by a value which varies as a function of the rotation speed of the engine, said device producing a periodic signal of which the beginning and the end are positioned in an essentially constant manner in each cycle, relative to the instant of the top dead centre position, with a predefined margin of error; wherein said electronic device comprises on the one hand at least one first stage means for generating a signal which is shifted by a constant interval relative to the signal which it receives, and on the other hand further stage means for generating a signal which is shifted relative to the signal which it receives, by an interval corresponding to a constant angle of rotation of the engine, these two types of stage being arranged in series in order to define at least one of the beginning and the end of the resulting said periodic signal.

2. A device according to claim 1, wherein said first stage means comprises a single said first stage ensuring a shift of a constant interval, the said single first stage receiving the ignition signal and controlling said at least one further stage which ensures a shift corresponding to a constant angle of rotation.

3. A device according to claim 2, wherein said first stage means includes: a monostable multivibrator consisting of a transistor and a capacitance which can discharge through said transistor on receiving the ignition signal, and further includes a comparator for comparing the charging voltage of said capacitance with a constant voltage in order to produce a signal at the moment when the compared said charging voltage and said constant voltage are equal.

4. A device according to any one of claims 1 to 3, wherein said second stage means for ensuring a shift corresponding to a constant angle of rotation of the engine includes a sawtooth voltage generator and a peak detector associated therewith and means for chopping the peak voltage obtained by the sawtooth voltage generator and for comparing the chopped voltage with the sawtooth voltage of said sawtooth voltage generator.

5. A device according to claim 4, wherein said sawtooth voltage generator comprises a condenser which can discharge through a transistor on receiving the signal received by said second stage means.

6. A device according to claim 2, wherein the angular shift relative to the top dead centre position of the piston on compression stroke, which shift corresponds to the beginning of the signal produced by the device, is substantially zero and said second stage means comprises a single second stage generating a signal which is shifted by a constant interval corresponding to a particular angle of rotation of the engine, said single second stage being arranged in series, downstream of said first stage means.

7. A device according to any one of claims 1 to 3, and including an internal combustion engine associated with the device, and a vibration sensor triggered by the said periodic signal and controlled to operate throughout the duration of the said signal.

8. A device according to claim 7, wherein said vibration sensor is adapted to identify a possible knock in the running of an internal combustion engine associated with the device.

* * * * *